United States Patent
Kim

(10) Patent No.: US 11,005,271 B2
(45) Date of Patent: May 11, 2021

(54) BATTERY BALANCING APPARATUS AND BATTERY BALANCING METHOD

(71) Applicant: LG CHEM, LTD., Seoul (KR)

(72) Inventor: Ki-Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 190 days.

(21) Appl. No.: 16/511,584

(22) Filed: Jul. 15, 2019

(65) Prior Publication Data

US 2020/0021119 A1 Jan. 16, 2020

(30) Foreign Application Priority Data

Jul. 16, 2018 (KR) .......................... 10-2018-0082437

(51) Int. Cl.
*H02J 7/00* (2006.01)
*B60L 50/64* (2019.01)
*B60L 58/22* (2019.01)

(52) U.S. Cl.
CPC ............. *H02J 7/0014* (2013.01); *B60L 50/64* (2019.02); *B60L 58/22* (2019.02); *H02J 7/0021* (2013.01)

(58) Field of Classification Search
CPC .................................................. H02J 7/0014
See application file for complete search history.

(56) References Cited

U.S. PATENT DOCUMENTS

| | | | | |
|---|---|---|---|---|
| 2012/0175953 A1* | 7/2012 | Ohkawa | .................. | B60L 58/14 307/18 |
| 2013/0002016 A1* | 1/2013 | Furukawa | ........... | H01M 10/425 307/9.1 |
| 2014/0055079 A1 | 2/2014 | Lee | | |
| 2014/0354291 A1* | 12/2014 | Kikuchi | ............... | G01R 31/382 324/434 |
| 2016/0277068 A1* | 9/2016 | Heinikoski | ............ | H04B 1/525 |
| 2016/0294019 A1* | 10/2016 | Yamauchi | ............ | G01R 31/392 |
| 2017/0021738 A1 | 1/2017 | Brochhaus | | |
| 2017/0334296 A1* | 11/2017 | Martin | ..................... | H02J 5/005 |
| 2017/0351561 A1* | 12/2017 | Yamazoe | ............ | G06F 11/0793 |
| 2018/0262021 A1 | 9/2018 | Kim et al. | | |

FOREIGN PATENT DOCUMENTS

| | | |
|---|---|---|
| JP | 2012-222913 A | 11/2012 |
| JP | 2013-198306 A | 9/2013 |
| KR | 10-1457191 B1 | 10/2014 |
| KR | 10-1564365 B1 | 10/2015 |
| KR | 10-1850295 B1 | 4/2018 |

\* cited by examiner

*Primary Examiner* — Robert Grant
(74) *Attorney, Agent, or Firm* — Birch, Stewart, Kolasch & Birch, LLP

(57) ABSTRACT

Disclosed is a battery balancing apparatus and method. The battery balancing apparatus includes a plurality of balancing circuits, each balancing circuit is connected in parallel to a respective battery cell among a plurality of battery cells and the plurality of balancing circuits are connected in series to each other, in one-to-one relationship; and a control unit operably coupled to each balancing circuit. The control unit selects at least one of the plurality of battery cells as a balancing target, based on a SOC of each battery cell, and outputs an enable signal and a balancing message to each balancing circuit connected to each battery cell selected as the balancing target. Each balancing circuit transmits a first wireless signal and a second wireless signal corresponding to the balancing message by using electric energy stored in each battery cell, when the enable signal is received by each balancing circuit.

14 Claims, 11 Drawing Sheets

BATTERY BALANCING APPARATUS AND BATTERY BALANCING METHOD

TECHNICAL FIELD

The present application claims priority to Korean Patent Application No. 10-2018-0082437 filed on Jul. 16, 2017 in the Republic of Korea, the disclosure of which is incorporated herein by reference.

The present disclosure relates to an apparatus and method for equalizing SOCs of a plurality of battery cells.

BACKGROUND ART

Recently, there is dramatically growing demand for portable electronic products such as laptop computers, video cameras and mobile phones, and with the intense development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages of free charging and discharging, a very low self-discharge rate and high energy density.

Meanwhile, if a battery pack including a plurality of battery cells connected in series is repeatedly charged and discharged, due to the differences in the environments of the battery pack or electrochemical characteristics between the plurality of battery cells, the plurality of battery cells may have different SOCs. Without battery balancing to equalize the SOCs of the plurality of battery cells, the life of each battery cell is shortened, and the performance of the battery pack is deteriorated.

At present, a passive balancing method for equalizing the SOCs of a plurality of battery cells is widely used. The passive balancing method generally lowers the SOC by connecting a balancing resistor in parallel to a battery cell having a relatively high SOC.

However, if the passive balancing method is used, considerable heat is generated from the balancing resistor during balancing, which may deteriorate the performance of neighboring circuit elements.

DISCLOSURE

Technical Problem

The present disclosure is designed to solve the problems of the related art, and therefore the present disclosure is directed to providing a battery balancing apparatus and a battery balancing method, which may reduce heat generation due to battery balancing by converting the electric energy of a battery cell into a wireless signal and transmitting the wireless signal, instead of consuming the electric energy of the battery cell by using a balancing resistor.

These and other objects and advantages of the present disclosure will be understood by the following description and will be apparent from the embodiments of the present disclosure. Additionally, it will be readily understood that the objects and advantages of the present disclosure are realized by the means set forth in the appended claims and combinations thereof.

Technical Solution

Various embodiments of the present disclosure to achieve the objects are as follows.

In one aspect of the present disclosure, there is provided a battery balancing apparatus, comprising: a plurality of balancing circuits, wherein each balancing circuit is connected in parallel to a respective battery cell among a plurality of battery cells and the plurality of balancing circuits are connected in series to each other, in one-to-one relationship; and a control unit operably coupled to each balancing circuit. The control unit is configured to select at least one of the plurality of battery cells as a balancing target, based on a SOC of each battery cell, and output an enable signal and a balancing message to each balancing circuit connected to each battery cell selected as the balancing target. Each balancing circuit is configured to transmit a first wireless signal and a second wireless signal corresponding to the balancing message by using electric energy stored in each battery cell, when the enable signal is received by each balancing circuit. The first wireless signal and the second wireless signal are at least partially canceled out by each other.

Each balancing circuit may include a balancing switch configured to operate in an ON state in response to the enable signal; and a first wireless transmitter and a second wireless transmitter connected to the balancing switch in series. The first wireless transmitter may be configured to transmit the first wireless signal while the balancing switch is operating in the ON state. The second wireless transmitter may be configured to transmit the second wireless signal while the balancing switch is operating in the ON state.

A phase of the first wireless signal and a phase of the second wireless signal may be opposite to each other.

The first wireless signal and the second wireless signal may be unmodulated sine waves having the same frequency and amplitude.

In another aspect of the present disclosure, there is also provided a battery balancing apparatus, comprising: a plurality of balancing circuits, wherein each balancing circuit is connected in parallel to a respective battery cell among a plurality of battery cells and the plurality of balancing circuits are connected in series to each other, in one-to-one relationship; and a control unit operably coupled to each balancing circuit. The control unit selects at least two of the plurality of battery cells as balancing targets, based on a SOC of each battery cell. When a first battery cell and a second battery cell are selected from the plurality of battery cells as the balancing targets, the control unit is configured to transmit an enable signal and a first balancing message to a first balancing circuit among the plurality of balancing circuits connected in parallel to the first battery cell and transmit the enable signal and a second balancing message to a second balancing circuit among the plurality of balancing circuits connected in parallel to the second battery cell. The first balancing circuit is configured to transmit a first wireless signal corresponding to the first balancing message by using electric energy stored in the first battery cell when the enable signal is received by the first balancing circuit. The second balancing circuit is configured to transmit a second wireless signal corresponding to the second balancing message by using electric energy stored in the second battery cell when the enable signal is received by the second balancing circuit. The first wireless signal and the second wireless signal are at least partially canceled out by each other.

Each balancing circuit may include a balancing switch configured to operate in an ON state in response to the enable signal; and a first wireless transmitter connected to the respective balancing switch in series. The first wireless transmitter may be configured to transmit a wireless signal corresponding to a balancing message output from the control unit, while the balancing switch is operating in the ON state.

A phase of the first wireless signal and a phase of the second wireless signal may be opposite to each other.

The first wireless signal and the second wireless signal may have the same frequency. The first wireless signal and the second wireless signal may have the same amplitude.

Each balancing circuit may further include a second wireless transmitter connected to the respective balancing switch in series. The control unit may be configured to transmit the enable signal and a third balancing message to the second balancing circuit when a SOC of the second battery cell is greater than a SOC of the first battery cell. The second wireless transmitter of the second balancing circuit may be configured to transmit a third wireless signal corresponding to the third balancing message by using electric energy stored in the second battery cell.

The first wireless signal, the second wireless signal and the third wireless signal may have the same frequency. A phase of the second wireless signal may be opposite to a phase of the first wireless signal and a phase of the third wireless signal. An amplitude of the second wireless signal may be equal to the sum of an amplitude of the first wireless signal and an amplitude of the third wireless signal.

In another aspect of the present disclosure, there is also provided a battery pack, comprising the battery balancing apparatus.

In another aspect of the present disclosure, there is also provided a battery balancing method, comprising: by a control unit, selecting at least one of a plurality of battery cells as a balancing target, based on SOCs of the plurality of battery cells connected in series to each other; by the control unit, outputting an enable signal and a balancing message to each balancing circuit connected in parallel to each battery cell selected as the balancing target; and by each balancing circuit, transmitting a first wireless signal and a second wireless signal corresponding to the balancing message by using electric energy stored in each battery cell selected as the balancing target, when the enable signal is received by each balancing circuit. The first wireless signal and the second wireless signal are at least partially canceled out by each other.

A phase of the first wireless signal and a phase of the second wireless signal may be opposite to each other.

Advantageous Effects

According to at least one of embodiments of the present disclosure, since the electric energy of a battery cell is not consumed using a balancing resistor but is converted into a wireless signal and transmitted, it is possible to reduce heat generation due to battery balancing.

In addition, since at least two wireless signals canceled out by each other are generated using the electric energy of the battery cell, it is possible to reduce the interference caused by the wireless signals transmitted during battery balancing.

The effects of the present disclosure are not limited to the above-mentioned effects, and other effects not mentioned herein will be clearly understood by those skilled in the art from the appended claims.

DESCRIPTION OF DRAWINGS

The accompanying drawings illustrate preferred embodiments of the present disclosure, and together with the following detailed description, serve to provide a further understanding of the technical aspects of the present disclosure, and the present disclosure should not be construed as limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented in hardware or software alone or in combination.

In addition, throughout the specification, it will be further understood that when an element is referred to as being "connected to" another element, it can be directly connected to the other element or intervening elements may be present.

Figure 1:
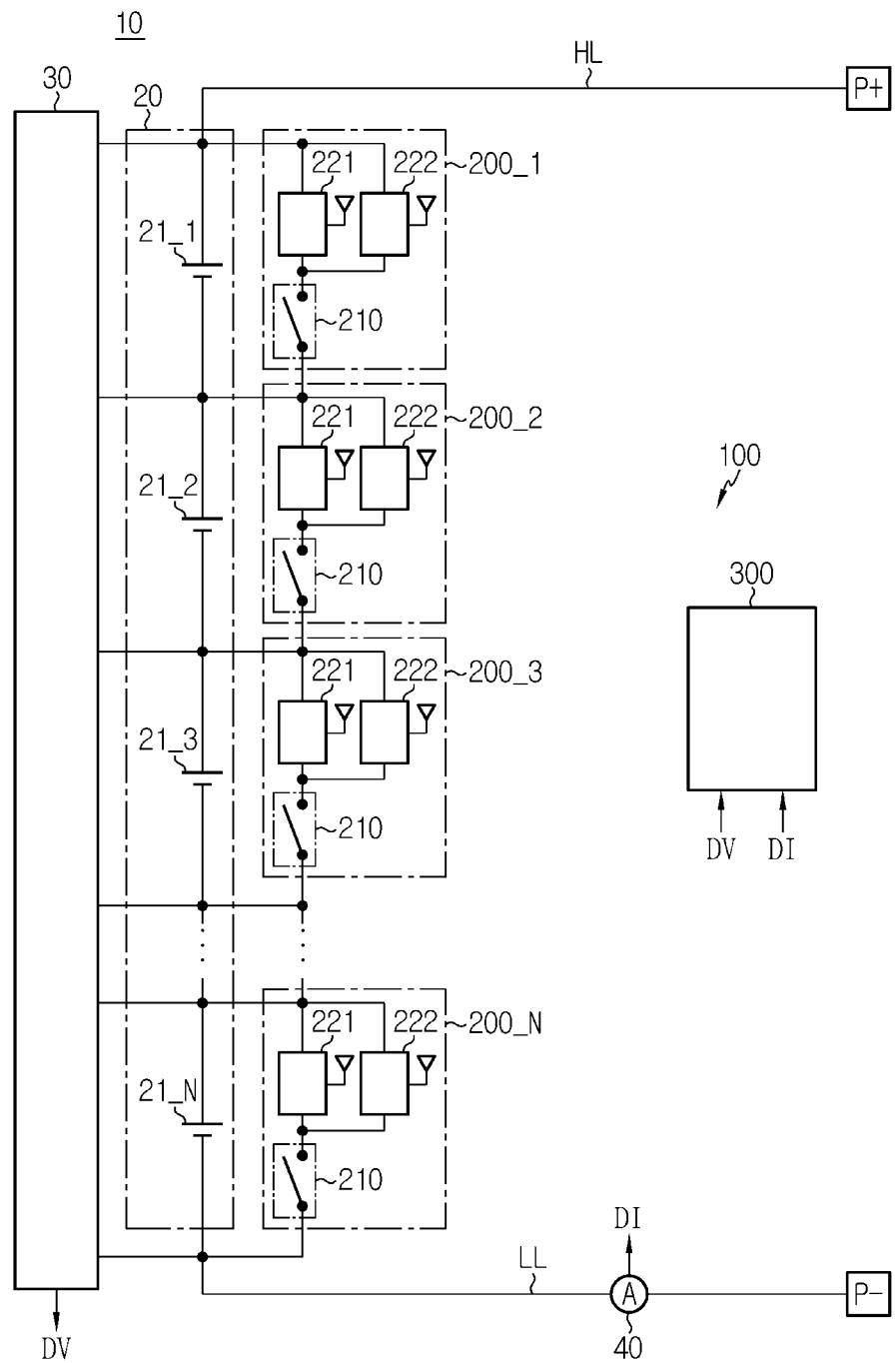
FIG. 1 is a diagram schematically showing a battery pack including a battery balancing apparatus according to an embodiment of the present disclosure.

FIG. 1 is a diagram schematically showing a battery pack 10 including a battery balancing apparatus 100 according to an embodiment of the present disclosure.

Referring to FIG. 1, the battery pack 10 includes a battery module 20, a voltage detection unit 30, a current detection unit 40, a battery balancing apparatus 100, a first power terminal P+, and a second power terminal P−. The battery pack 10 may be loaded on an electric vehicle and may supply electric power required for driving an electric motor of the electric vehicle.

The battery module 20 may include a plurality of battery cells 21_1 to 21_N connected in series to each other. Reference sign 21_$i$ denotes an $i^{th}$ balancing cell.

The voltage detection unit 30 may detect a voltage of each of the plurality of battery cells 21_1 to 21_N (N is an integer equal to or greater than 2) and transmit voltage data DV representing the detected voltages to the control unit 300.

The current detection unit 40 is installed on a charge/discharge path of the battery pack 10. For example, the current detection unit 40 may be installed on a low-voltage line LL that connects a negative electrode terminal of the battery module 20 to the second power terminal P−. Here, the current detection unit 40 may be installed on a high-voltage line HL that connects a positive electrode terminal of the battery module 20 to the first power terminal P+. The current detection unit 40 is configured to detect a current flowing through the battery module 20. The current detection unit 40 may transmit current data DI indicating the detected current to the control unit 300.

The battery balancing apparatus 100 includes a plurality of balancing circuits 200_1 to 200_N and a control unit 300. If i=1 to N, the reference sign 200_$i$ denotes an its' balancing circuit.

The plurality of balancing circuits 200_1 to 200_N are connected in parallel to the plurality of battery cells 21_1 to 21_N, respectively. That is, the balancing circuit 200_$i$ is connected in parallel to the battery cell 21_$i$.

The balancing circuit 200_$i$ includes a balancing switch 210 and a first wireless transmitter 221. Optionally, the balancing circuit 200_$i$ may further include a second wireless transmitter 222.

The balancing switch 210 is configured to operate in an ON state in response to an enable signal (for example, a predetermined high level voltage) from the control unit 300. For example, a known switching element such as a MOSFET may be used as the balancing switch 210. The balancing switch 210 operates in an OFF state when the control unit 300 stops generating the enable signal.

The first wireless transmitter 221 is connected in series to the balancing switch 210. While the balancing switch 210 is operating in the ON state, a discharging path for the battery cell 21 is formed through the balancing switch 210. Accordingly, the first wireless transmitter 221 is activated using the electric energy supplied from the battery cell 21 through the discharging path. If the first wireless transmitter 221 is activated, the first wireless transmitter 221 is configured to transmit a wireless signal corresponding to the balancing message from the control unit 300.

The second wireless transmitter 222 may also be connected in series to the balancing switch 210. As shown in the figure, the second wireless transmitter 222 may be connected in parallel to the first wireless transmitter 221. While the balancing switch 210 is operating in the ON state, the second wireless transmitter 222 may be activated using the electric energy supplied from the battery cell 21 through the discharge path, like the first wireless transmitter 221. When the second wireless transmitter 222 is activated, the second wireless transmitter 222 is configured to transmit a wireless signal corresponding to the balancing message from the control unit 300.

The control unit 300 may be physically implemented using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. The control unit 300 may include a memory. The memory stores data, instructions and software required for the entire operation of the control unit 300, and may include at least one type of storing medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) and programmable read-only memory (PROM).

The control unit 300 is operably coupled to the voltage detection unit 30, the current detection unit 40 and the balancing switch 210 of each of the plurality of balancing circuits 200_1 to 200_N. Optionally, the control unit 300 may be operably coupled to at least one of the first wireless transmitter 221 and the second wireless transmitter 222 of each of the plurality of balancing circuits 200_1 to 200_N. For example, the control unit 300 may communicate with the voltage detection unit 30, the current detection unit 40 and the plurality of balancing circuits 200_1 to 200_N through a wired network such as a local area network (LAN), a controller area network (CAN) and a daisy chain or a local wireless network such as Bluetooth, ZigBee and WiFi.

The control unit 300 may determine State Of Charge (SOC) of the plurality of battery cells 21_1 to 21_N, based on at least one of the voltage data DV from the voltage detection unit 30 and the current data DI from the current detection unit 40. For example, the control unit 300 may determine the SOCs of the plurality of battery cells 21_1 to 21_N by integrating the current value corresponding to the current data from the current detection unit 40. Here, the control unit 300 may determine the SOCs of the plurality of battery cells 21_1 to 21_N using other known algorithms such as an equivalent circuit model and a Kalman filter.

The control unit 300 may select at least one of the plurality of battery cells 21_1 to 21N as a balancing target, based on the SOCs of the plurality of battery cells 21_1 to 21_N. For example, all battery cells 21 having an SOC greater than a threshold SOC (for example, 90%) among the plurality of battery cells 21_1 to 21_N may be selected as balancing targets. As another example, a battery cell 21 having the greatest SOC among the plurality of battery cells 21_1 to 21_N may be selected as a balancing target. As still another example, all battery cells 21 other than a battery cell 21 having the smallest SOC among the plurality of battery cells 21_1 to 21_N may be selected as balancing targets. In further another example, all battery cells 21 having a SOC greater by a predetermined value (for example, 10%) than the battery cell 21 having the smallest SOC among the plurality of battery cells 21_1 to 21_N may be selected as balancing targets.

The control unit 300 is configured to output an enable signal and a balancing message to a balancing circuit (for example, 200_1) connected in parallel to the battery cell (for example, 21_1) selected as the balancing target.

The control unit 300 may generate a balancing message that is to be output to the balancing circuits (for example, 200_1 and 200_3) connected in parallel to the battery cells (for example, 21_1 and 21_3) based on the SOC of at least one battery cell (for example, 21_1 and 21_3) selected as the balancing target. A table having data indicating at least one of frequency and amplitude associated with each of the plurality of SOCs may be stored in advance in the memory of the control unit 300. In the table, a relatively large SOC may be associated with a relatively large frequency or a relatively large amplitude. The control unit 300 may determine at least one of the frequency and the amplitude corresponding to the SOC of the battery cell (for example, 21_1) and at least one of the frequency and the amplitude corresponding to the SOC of the battery cell (for example, 21_3) by referring to the table.

For example, it is assumed that the SOC (for example, 94%) of the battery cell (for example, 21_1) is greater than the SOC (for example, 92%) of the battery cell (for example, 21_3). If so, the control unit 300 may obtain at least one of the frequency and amplitude associated with the SOC (for example, 94%) of the battery cell (for example, 21_1) from the table and obtain at least one of the frequency and amplitude associated with the SOC for example, 92%) of the battery cell (for example, 21_3) from the table. In this case, the frequency associated with the SOC (for example, 94%) may be greater than the frequency associated with the SOC (for example, 92%). Alternatively, the amplitude associated with the SOC (for example, 94%) may be greater than the amplitude associated with the SOC (for example, 92%). The control unit 300 may generate a balancing message indicating at least one of the frequency and the amplitude associated with the SOC (for example, 94%) and then output the balancing message to the balancing circuit (for example, 200_1). Also, the control unit 300 may generate a balancing message indicating at least one of the frequency and the amplitude associated with the SOC (for example, 92%) and then output the balancing message to the balancing circuit (for example, 200_3).

Alternatively, the control unit 300 may generate a balancing message regardless of the SOC of the balancing target. In this case, the balancing message output by the control unit 300 may indicate a predetermined frequency and amplitude.

As described above, the balancing switch 210 of the balancing circuit 200_i operates in the ON state in response to the enable signal output by the control unit 300. Accordingly, at least one of the first wireless transmitter 221 and the second wireless transmitter 222 of the balancing circuit 200_i connected in parallel to the battery cell 21_i selected as the balancing target starts transmitting the wireless signal corresponding to the balancing message from the control unit 300, and thus the SOC of the selected battery cell 21_i selected as the balancing target gradually decreases.

Alternatively, the control unit 300 may output only the enable signal and may not output the balancing message. In this case, the first wireless transmitter 221 of the balancing circuit (for example, 200_3) connected in parallel to the balancing target (for example, 21_3) may transmit a wireless signal having a predetermined frequency and amplitude while the balancing switch 210 of the balancing circuit 200_3 is in the ON state due to the enable signal. If the balancing circuit (for example, 200_3) further includes the second wireless transmitter 222, the second wireless transmitter 222 of the balancing circuit (for example, 200_3) may transmit a wireless signal having a phase different from that of the wireless signal transmitted by the first wireless transmitter 221 of the balancing circuit (for example, 200_3).

Figure 2:
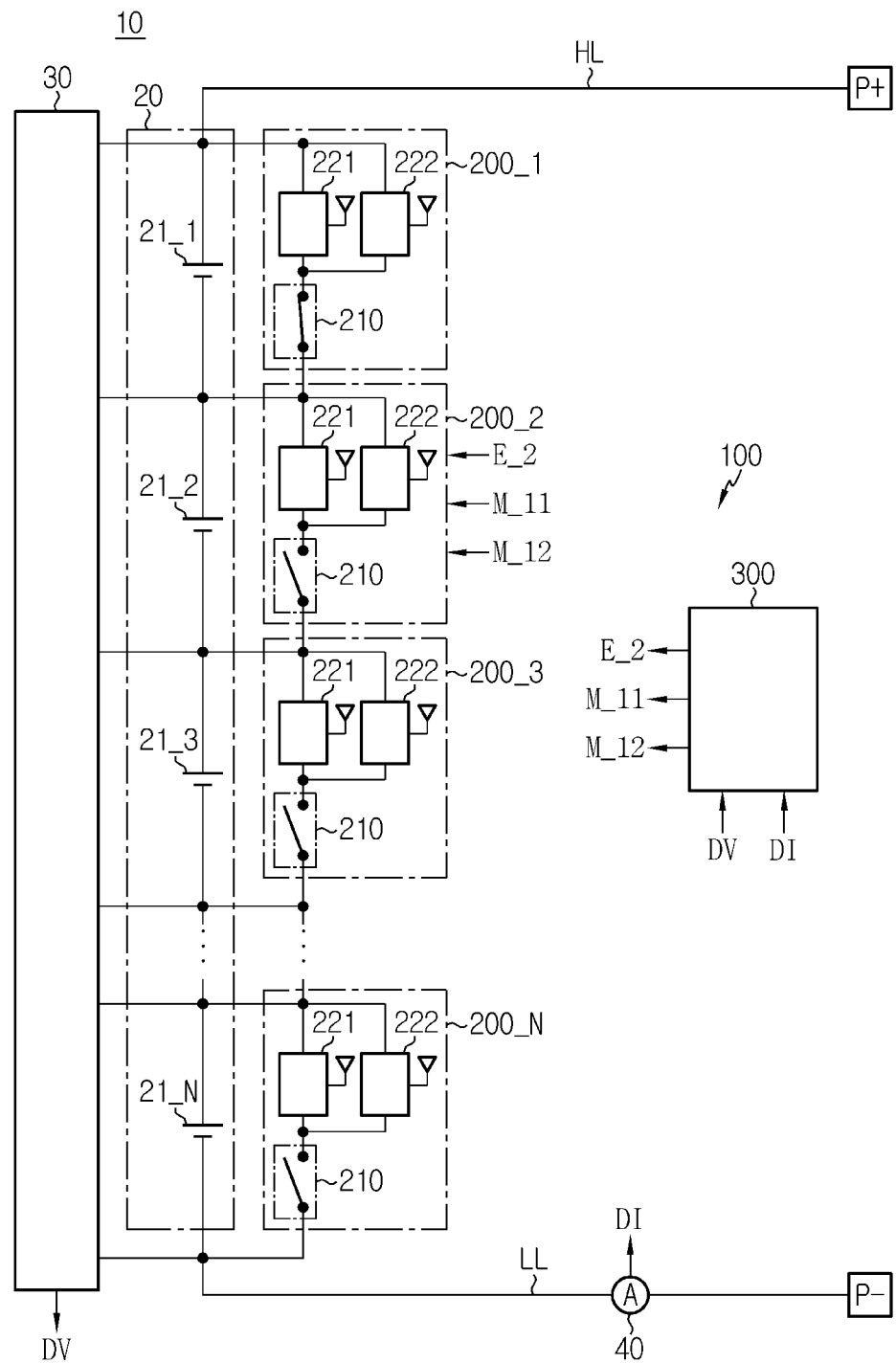
FIGS. 2 and 3 are diagrams for illustrating an exemplary situation where battery balancing is performed by the balancing apparatus of FIG. 1.
Figure 3:
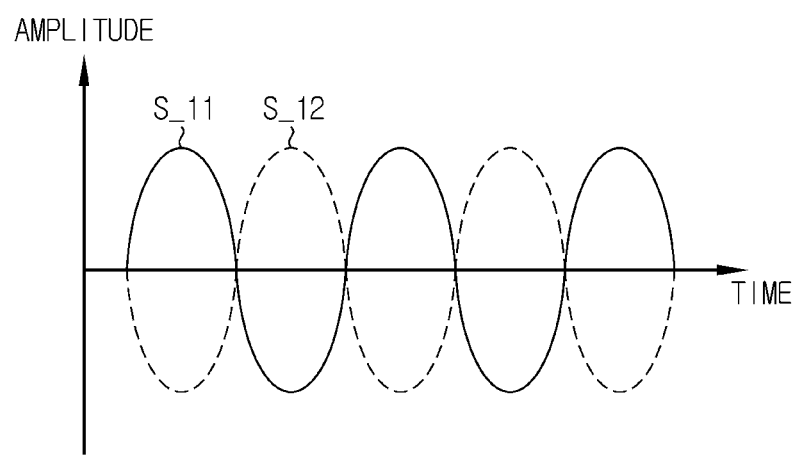

FIGS. 2 and 3 are diagrams for illustrating an exemplary situation where battery balancing is performed by the balancing apparatus 100 of FIG. 1. For convenience of explanation, it is assumed that one battery cell 21_2 is selected as a balancing target.

Referring to FIG. 2, the balancing switch 210 of the balancing circuit 200_2 operates in the ON state as the control unit 300 outputs the enable signal E_2 to the balancing switch 210 of the balancing circuit 200_2 connected in parallel to the battery cell 21_2 selected as the balancing target. Also, the control unit 300 may transmit a balancing message M_11 to the first wireless transmitter 221 of the balancing circuit 200_2 and a balancing message M_12 to the second wireless transmitter 222 of the balancing circuit 200_2. The control unit 300 may generate the balancing message M_11 and the balancing message M_12 based on the SOC of the battery cell 21_2 selected as the balancing target.

Accordingly, as shown in FIG. 3, the first wireless transmitter 221 of the balancing circuit 200_2 transmits a wireless signal S_11 corresponding to the balancing message M_11, and the second wireless transmitter 222 of the balancing circuit 200_2 transmits a wireless signal S_12 corresponding to the balancing message M_12. The control unit 300 may generate the balancing message M_11 and the balancing message M_12 having different phases such that that the wireless signal S_11 and the wireless signal S_12 are at least partially canceled out by each other.

The wireless signal S_11 and the wireless signal S_12 may have phases opposite to each other. The wireless signal S_11 and the wireless signal S_12 may have a frequency and amplitude corresponding to the SOC of the battery cell 21_2. For example, the wireless signal S_11 and the wireless signal S_12 may be unmodulated sine waves having the same frequency and amplitude. Accordingly, the wireless signal S_11 and the wireless signal S_12 may be canceled out at least partially by each other.

As the wireless signal S_11 and the wireless signal S_12 are continuously transmitted by the first wireless transmitter 221 and the second wireless transmitter 222 of the balancing circuit 200_2, the SOC of the battery cell 21_2 is gradually lowered, thereby equalizing the SOCs of the plurality of battery cells 21_1 to 21_N.

It has been assumed that the battery cell 21_2 is selected as the balancing target with reference to FIGS. 2 and 3. However, the battery balancing may be performed in the same way even though another battery cell (for example, 21_N) is selected as the balancing target instead of the battery cell 21_2 or along with the battery cell 21_2.

Figure 4:
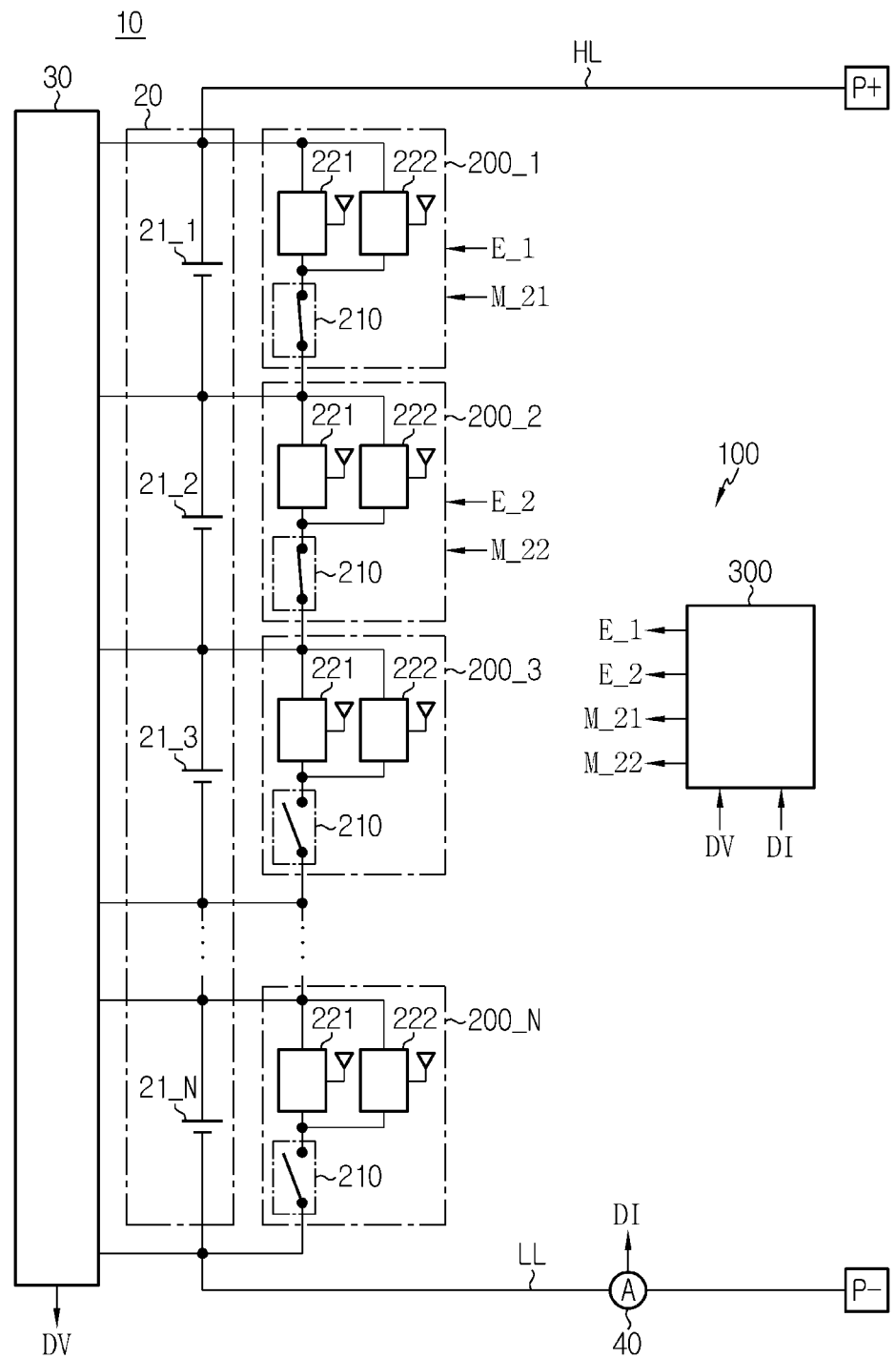
FIGS. 4 and 5 are diagrams for illustrating another exemplary situation where battery balancing is performed by the balancing apparatus of FIG. 1.
Figure 5:
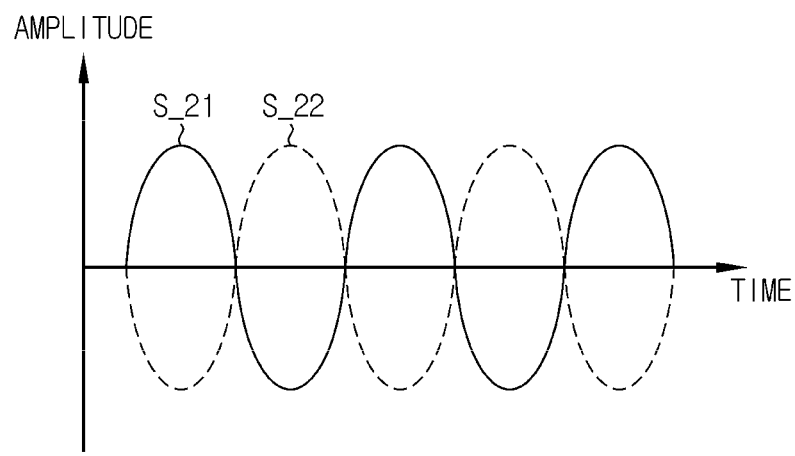

FIGS. 4 and 5 are diagrams for illustrating another exemplary situation where battery balancing is performed by the balancing apparatus 100 of FIG. 1. For convenience of explanation, it is assumed that the battery cell 21_1 and the battery cell 21_2 having the same SOC (for example, 92%) are selected as balancing targets.

Referring to FIG. 4, as the control unit 300 outputs enable signals E_1, E_2 to the balancing switch 210 of the balancing circuit 200_1 connected in parallel to the battery cell 21_1 and the balancing switch 210 of the balancing circuit 200_2 connected in parallel to the battery cell 21_2, respectively, the balancing switch 210 of the balancing circuit 200_1 and the balancing switch 210 of the balancing circuit 200_2 operate in the ON state. At the same time, the control unit 300 may transmit a balancing message M_21 to the first wireless transmitter 221 of the balancing circuit 200_1 and a balancing message M_22 to the first wireless transmitter 221 of the balancing circuit 200_2. The control unit 300 may generate the balancing message M_21 and the balancing message M_22 based on the SOCs of the battery cell 21_1 and the battery cell 21_2 selected as the balancing targets. The control unit 300 may generate the balancing message M_21 and the balancing message M_22 indicating different phases such that the wireless signal S_21 and the wireless signal S_22 are at least partially canceled out by each other.

The balancing message M_21 may include data indicating characteristics (for example, frequency, amplitude, phase, and the like) of the wireless signal to be transmitted by the first wireless transmitter 221 of the balancing circuit 200_1. The balancing message M_22 may include data indicating characteristics (for example, frequency, amplitude, phase, and the like) of the wireless signal to be transmitted by the first wireless transmitter 221 of the balancing circuit 200_2.

Accordingly, as shown in FIG. 5, the first wireless transmitter 221 of the balancing circuit 200_1 transmits the wireless signal S_21 corresponding to the balancing message M_21, and the first wireless transmitter 221 of the balancing circuit 200_2 transmits the wireless signal S_22 corresponding to the balancing message M_22.

The wireless signal S_21 and the wireless signal S_22 may have phases opposite to each other. For example, the wireless signal S_21 and the wireless signal S_22 may be unmodulated sine waves having the same frequency and amplitude. Accordingly, the wireless signal S_21 and the wireless signal S_22 may be canceled out at least partially by each other.

As the wireless signal S_21 and the wireless signal S_22 are continuously transmitted by the first wireless transmitter 221 of the balancing circuit 200_1 and the first wireless transmitter 221 of the balancing circuit 200_2, the SOCs of the battery cell 21_1 and the battery cell 21_2 are gradually lowered, thereby equalizing the SOCs of the plurality of battery cells 21_1 to 21_N.

Figure 6:
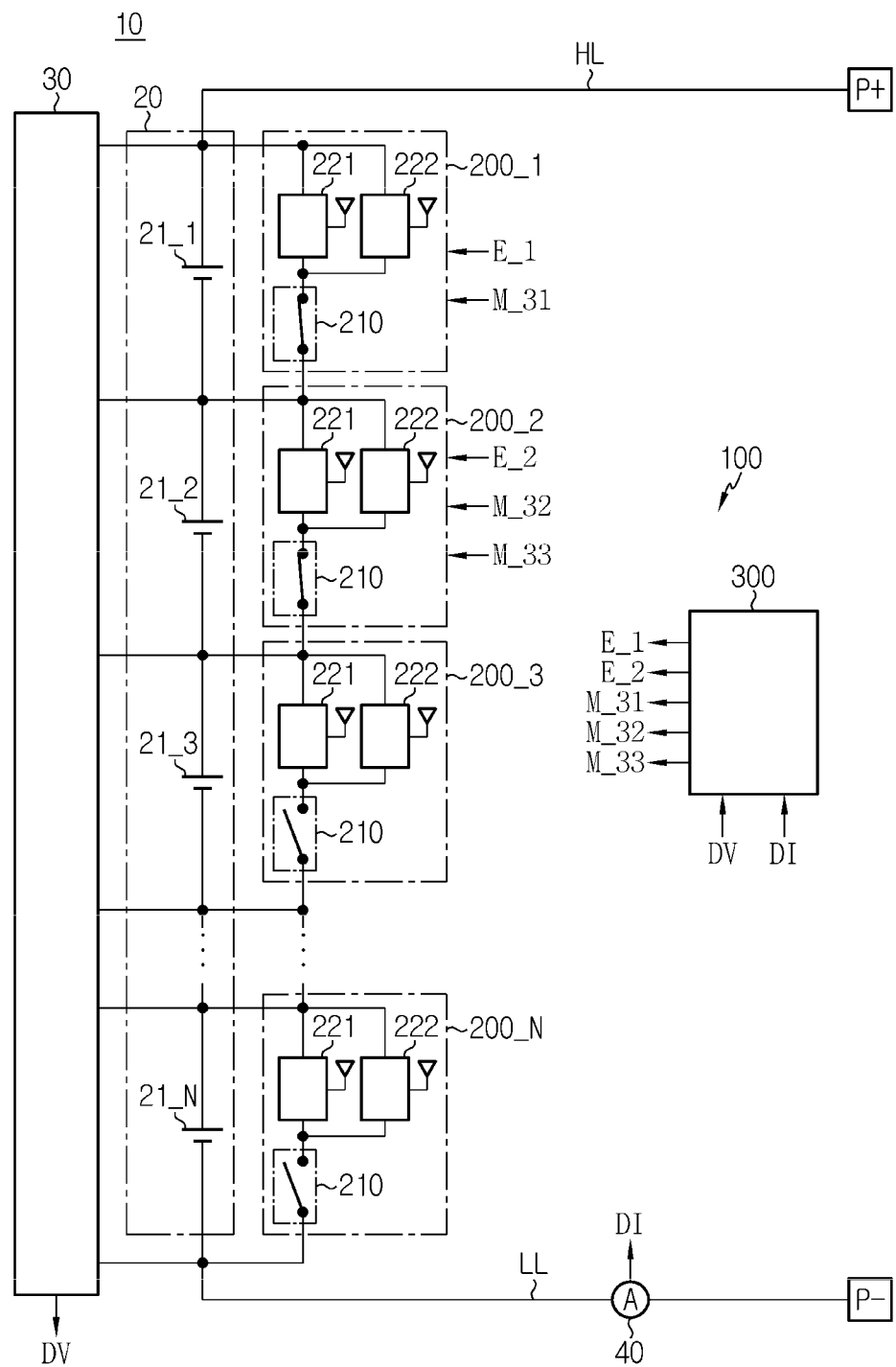
FIGS. 6 and 7 are diagrams for illustrating still another exemplary situation where battery balancing is performed by the balancing apparatus of FIG. 1.
Figure 7:
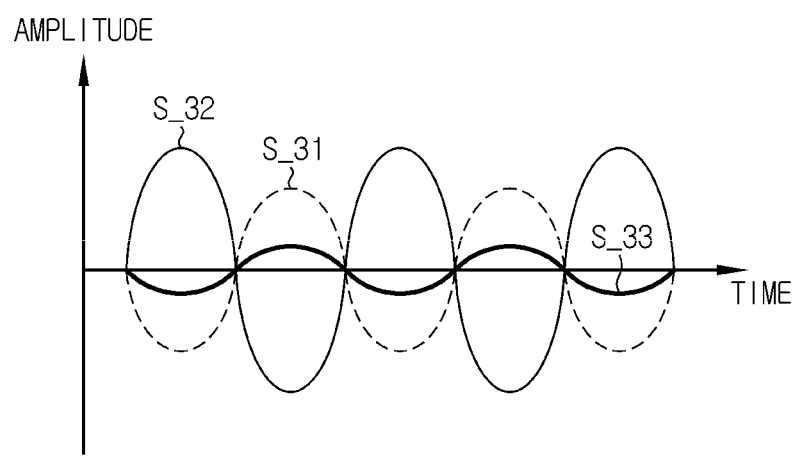

FIGS. 6 and 7 are diagrams for illustrating still another exemplary situation where battery balancing is performed by the balancing apparatus 100 of FIG. 1. For convenience of explanation, it is assumed that the battery cell 21_1 having a SOC (for example, 92%) and the battery cell 21_2 having a SOC (for example, 94%) are selected as balancing targets.

Referring to FIG. 6, as the control unit 300 outputs enable signals E_1, E_2 to the balancing switch 210 of the balancing circuit 200_1 connected in parallel to the battery cell 21_1 and the balancing switch 210 of the balancing circuit 200_2 connected in parallel to the battery cell 21_2, respectively, the balancing switch 210 of the balancing circuit 200_1 and the balancing switch 210 of the balancing circuit 200_2 operate in the ON state. At the same time, the control unit 300 may transmit a balancing message M_31 to the first wireless transmitter 221 of the balancing circuit 200_1, a balancing message M_32 to the first wireless transmitter 221 of the balancing circuit 200_2, and a balancing message M_33 to the second wireless transmitter 222 of the balancing circuit 200_2. The control unit 300 may generate the balancing message M_31, the balancing message M_32 and the balancing message M_33 based on the SOCs of the battery cell 21_1 and the battery cell 21_2 selected as the balancing targets. The control unit 300 may generate the balancing message M_31, the balancing message M_32 and the balancing message M_33 such that any one (for example, the balancing message M_31) of the balancing message M_31, the balancing message M_32 and the balancing message M_33 has a phase different from that of at least one of the other balancing messages (for example, M_33) and thus the wireless signal S_31, the wireless signal S_32 and the wireless signal S_33 are at least partially canceled out by each other.

The balancing message M_31 may include data indicating characteristics (for example, frequency, amplitude, phase, and so on) of the wireless signal to be transmitted by the first wireless transmitter 221 of the balancing circuit 200_1. The balancing message M_32 may include data indicating characteristics (for example, frequency, amplitude, phase, and so on) of the wireless signal to be transmitted by the first wireless transmitter 221 of the balancing circuit 200_2. The balancing message M_33 may include data indicating characteristics (for example, frequency, amplitude, phase, and so on) of the wireless signal to be transmitted by the second wireless transmitter 222 of the balancing circuit 200_2.

Accordingly, as shown in FIG. 7, the first wireless transmitter 221 of the balancing circuit 200_1 transmits the wireless signal S_31 corresponding to the balancing message M_31, the first wireless transmitter 221 of the balancing circuit 200_2 transmits the wireless signal S_32 corresponding to the balancing message M_32, and the second wireless transmitter 222 of the balancing circuit 200_2 transmits the wireless signal S_33 corresponding to the balancing message M_33.

The wireless signal S_31 and the wireless signal S_33 may have phases opposite to the phase of the wireless signal S_32. For example, if the wireless signal S_31, the wireless signal S_32 and the wireless signal S_33 are unmodulated sine waves, the wireless signal S_31, the wireless signal S_32 and the wireless signal S_33 have the same frequency, and the amplitude of the wireless signal S_32 may be greater than the amplitude of the wireless signal S_31 and the amplitude of the wireless signal S_33. The amplitude of the wireless signal S_32 may be equal to the sum of the amplitude of the wireless signal S_31 and the amplitude of the wireless signal S_33. Accordingly, the wireless signal S_31, the wireless signal S_32 and the wireless signal S_33 may be canceled out at least partially by each other.

As the wireless signal S_31, the wireless signal S_32 and the wireless signal S_33 are continuously transmitted by the first wireless transmitter 221 of the balancing circuit 200_1, the first wireless transmitter 221 of the balancing circuit 200_2, and the second wireless transmitter 222 of the balancing circuit 200_2, respectively, the SOCs of the battery cell 21_1 and the battery cell 21_2 are gradually lowered, thereby equalizing the SOCs of the plurality of battery cells 21_1 to 21_N.

In particular, by controlling the amplitude of the wireless signal S_32 to be larger than the amplitude of the wireless signal S_31, it is possible to lower the relatively higher SOC (for example, 94%) of the battery cell 21_2 faster than the SOC (for example, 92%) of the battery cell 21_1.

Figure 8:
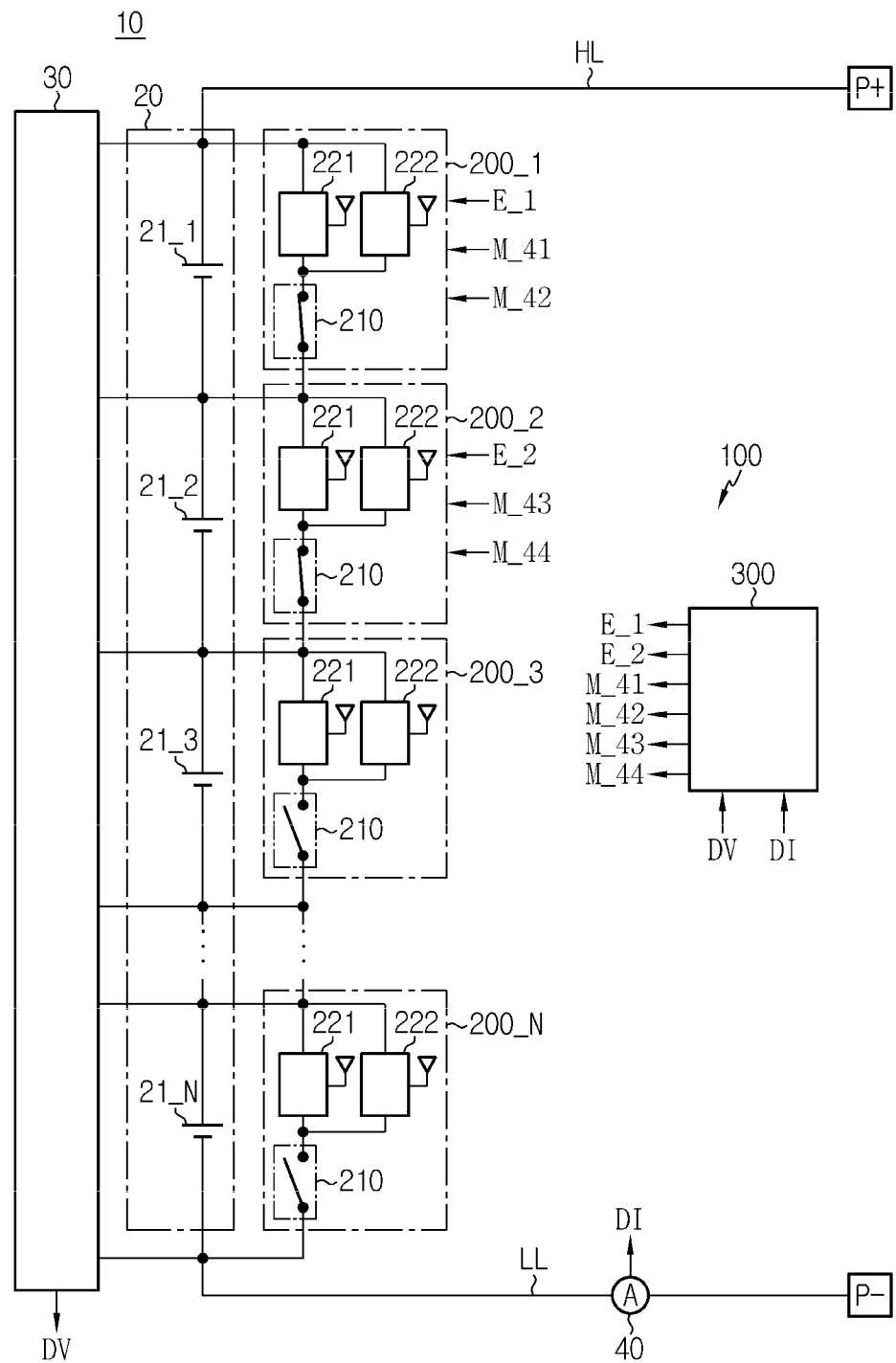
FIGS. 8, 9 and 10 are diagrams for illustrating still another exemplary situation where battery balancing is performed by the balancing apparatus of FIG. 1.
Figure 9:
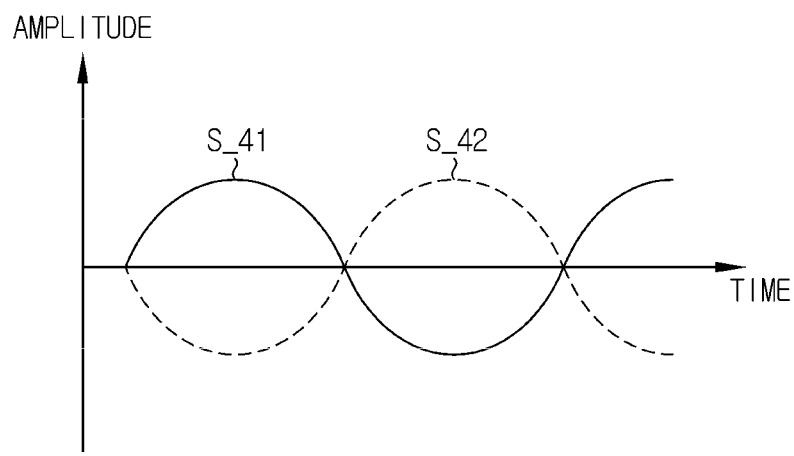
Figure 10:
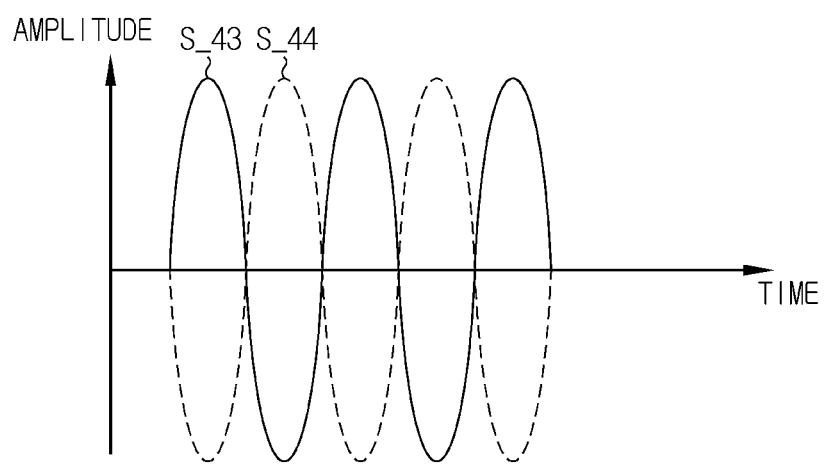

FIGS. 8, 9 and 10 are diagrams for illustrating still another exemplary situation where battery balancing is performed by the balancing apparatus 100 of FIG. 1. For convenience of explanation, it is assumed that the battery cell 21_1 having a SOC (for example, 92%) and the battery cell 21_2 having a SOC (for example, 94%) are selected as balancing targets.

Referring to FIG. 8, as the control unit 300 outputs enable signals E_1, E_2 to the balancing switch 210 of the balancing circuit 200_1 connected in parallel to the battery cell 21_1 and the balancing switch 210 of the balancing circuit 200_2 connected in parallel to the battery cell 21_2, respectively, the balancing switch 210 of the balancing circuit 200_1 and the balancing switch 210 of the balancing circuit 200_2 operate in the ON state.

At the same time, the control unit 300 may transmit a balancing message M_41 to the first wireless transmitter 221 of the balancing circuit 200_1, a balancing message M_42 to the second wireless transmitter 222 of the balancing circuit 200_1, a balancing message M_43 to the first wireless transmitter 221 of the balancing circuit 200_2, and a balancing message M_44 to the second wireless transmitter 222 of the balancing circuit 200_2.

The control unit 300 may generate the balancing message M_41, the balancing message M_42, the balancing message M_43 and the balancing message M_44 based on the SOCs of the battery cell 21_1 and the battery cell 21_2 selected as the balancing targets. The control unit 300 may generate the balancing message M_41 and the balancing message M_42 indicating different phases such that the wireless signal S_41 and the wireless signal S_42 may be at least partially canceled out by each other. The control unit 300 may generate the balancing message M_43 and the balancing message M_44 indicating different phases such that the wireless signal S_43 and the wireless signal S_44 may be at least partially canceled out by each other.

The balancing message M_41 may include data indicating characteristics (for example, frequency, amplitude, phase, and so on) of the wireless signal to be transmitted by the first wireless transmitter 221 of the balancing circuit 200_1. The balancing message M_42 may include data indicating characteristics (for example, frequency, amplitude, phase, and so on) of the wireless signal to be transmitted by the second wireless transmitter 222 of the balancing circuit 200_1. The balancing message M_43 may include data indicating characteristics (for example, frequency, amplitude, phase, and so on) of the wireless signal to be transmitted by the first wireless transmitter 221 of the balancing circuit 200_2. The balancing message M_44 may include data indicating characteristics (for example, frequency, amplitude, phase, and so on) of the wireless signal to be transmitted by the second wireless transmitter 222 of the balancing circuit 200_2.

Accordingly, as shown in FIGS. 9 and 10, the first wireless transmitter 221 of the balancing circuit 200_1 transmits a wireless signal S_41 corresponding to the balancing message M_41, the second wireless transmitter 222 of the balancing circuit 200_1 transmits a wireless signal S_42 corresponding to the balancing message M_42, the first wireless transmitter 221 of the balancing circuit 200_2 transmits a wireless signal S_43 corresponding to the balancing message M_43, and the second wireless transmitter 222 of the balancing circuit 200_2 transmits a wireless signal S_44 corresponding to the balancing message M_44.

The wireless signal S_41 and the wireless signal S_42 may have phases opposite to each other. For example, the wireless signal S_41 and the wireless signal S_42 may be unmodulated sine waves having the same frequency and amplitude. Accordingly, the wireless signal S_41 and the wireless signal S_42 may be canceled out at least partially by each other.

The wireless signal S_43 and the wireless signal S_44 may have phases opposite to each other. For example, the wireless signal S_43 and the wireless signal S_44 may be unmodulated sine waves having the same frequency and amplitude. Accordingly, the wireless signal S_43 and the wireless signal S_44 may be canceled out at least partially by each other.

The amplitudes of the wireless signal S_43 and the wireless signal S_44 may be greater than the amplitudes of the wireless signal S_41 and the wireless signal S_42. Alternatively, the frequencies of the wireless signal S_43 and the wireless signal S_44 may be greater than the frequencies of the wireless signal S_41 and the wireless signal S_42.

As the wireless signal S_41, the wireless signal S_42, the wireless signal S_43 and the wireless signal S_44 are continuously transmitted by the first wireless transmitter 221 of the balancing circuit 200_1, the second wireless transmitter 222 of the balancing circuit 200_1, the first wireless transmitter 221 of the balancing circuit 200_2 and the second wireless transmitter 222 of the balancing circuit 200_2, respectively the SOCs of the battery cell 21_1 and the battery cell 21_2 are gradually lowered, thereby equalizing the SOCs of the plurality of battery cells 21_1 to 21_N.

In particular, by controlling the amplitude or frequency of the wireless signal S_43 and the wireless signal S_44 to be greater than the amplitude or frequency of the wireless signal S_41 and the wireless signal S_42, it is possible to lower the relatively high SOC of the battery cell 21_2 faster than the SOC of the battery cell 21_1.

Figure 11:
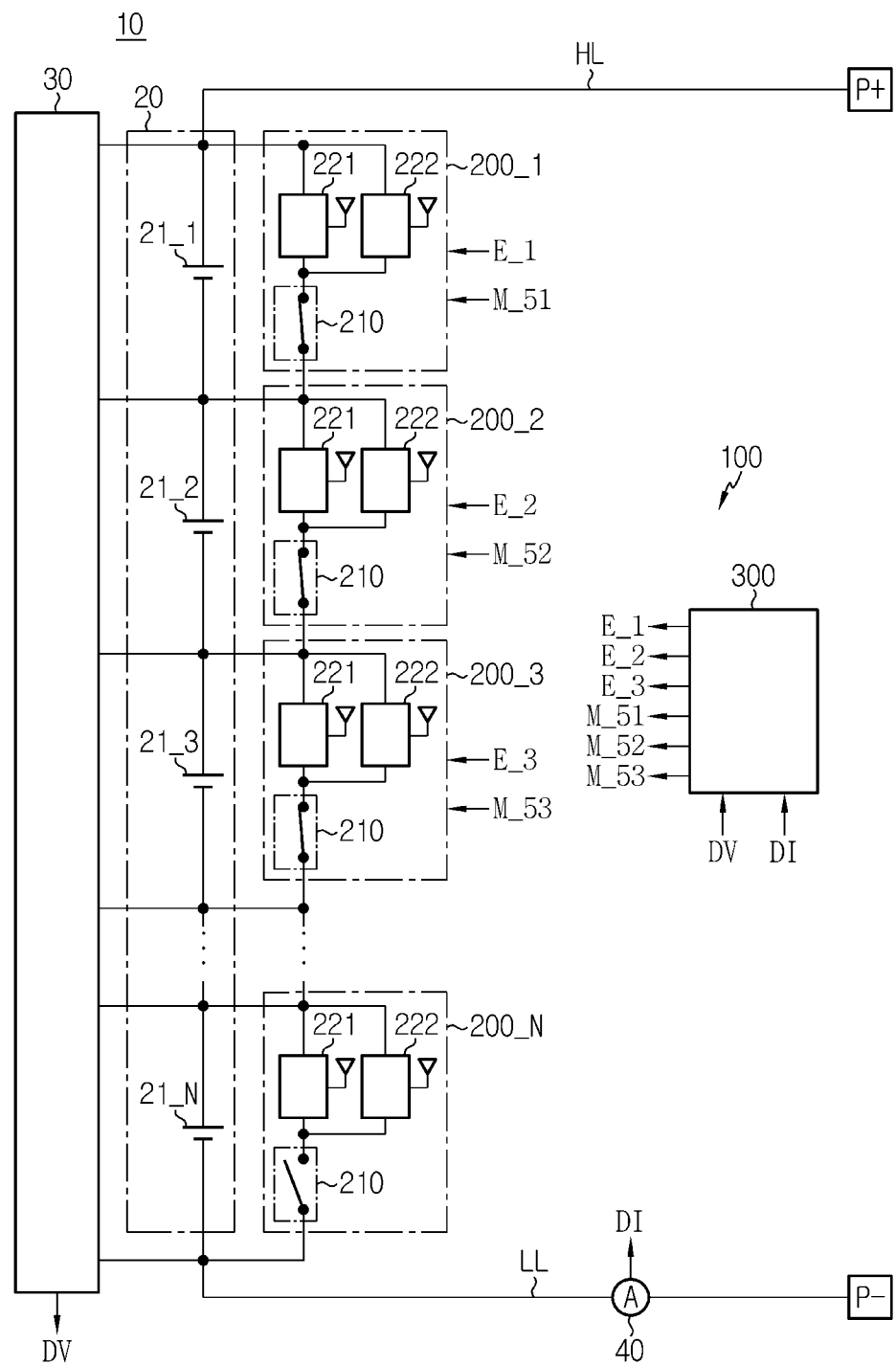
FIGS. 11 and 12 are diagrams for illustrating still another exemplary situation where battery balancing is performed by the balancing apparatus of FIG. 1.
Figure 12:
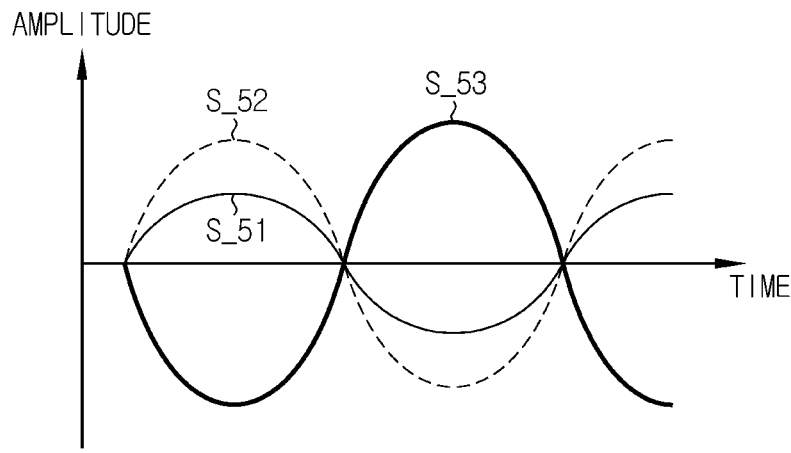

FIGS. 11 and 12 are diagrams for illustrating still another exemplary situation where battery balancing is performed by the balancing apparatus 100 of FIG. 1. For convenience of explanation, it is assumed that the battery cell 21_1 having a SOC (for example, 92%), the battery cell 21_2 having a SOC (for example, 94%) and the battery cell 21_3 having a SOC (for example, 96%) are selected as balancing targets.

Referring to FIG. 11, as the control unit 300 outputs enable signals E_1, E_2, E_3 to the balancing switch 210 of the balancing circuit 200_1 connected in parallel to the battery cell 21_1, the balancing switch 210 of the balancing circuit 200_2 connected in parallel to the battery cell 21_2, and the balancing switch 210 of the balancing circuit 200_3 connected in parallel to the battery cell 21_3, respectively, the balancing switch 210 of the balancing circuit 200_1, the balancing switch 210 of the balancing circuit 200_2 and the balancing switch 210 of the balancing circuit 200_3 operate in the ON state. At the same time, the control unit 300 may transmit a balancing message M_51 to the first wireless transmitter 221 of the balancing circuit 200_1, a balancing message M_52 to the first wireless transmitter 221 of the balancing circuit 200_2, and a balancing message M_53 to the first wireless transmitter 221 of the balancing circuit 200_3.

The control unit 300 may generate the balancing message M_51, the balancing message M_52 and the balancing message M_53 based on the SOCs of the battery cell 21_1, the battery cell 21_2 and the battery cell 21_3 selected as the balancing targets. The control unit 300 may generate the balancing message M_51, the balancing message M_52 and the balancing message M_53 such that any one (for example, M_52) of the balancing message M_51, the balancing message M_52 and the balancing message M_53 indicates a phase different from at least one of the other balancing messages (for example, the balancing message M_53) and thus the wireless signal S_51, the wireless signal S_52 and the wireless signal S_53 may be at least partially canceled out by each other.

The balancing message M_51 may include data indicating characteristics (for example, frequency, amplitude, phase, and so on) of the wireless signal to be transmitted by the first wireless transmitter 221 of the balancing circuit 200_1. The balancing message M_52 may include data indicating characteristics (for example, frequency, amplitude, phase, and so on) of the wireless signal to be transmitted by the first wireless transmitter 221 of the balancing circuit 200_2. The balancing message M_53 may include data indicating characteristics (for example, frequency, amplitude, phase, and so on) of the wireless signal to be transmitted by the first wireless transmitter 221 of the balancing circuit 200_3.

Accordingly, as shown in FIG. 12, the first wireless transmitter 221 of the balancing circuit 200_1 transmits a wireless signal S_51 corresponding to the balancing message M_51, the first wireless transmitter 221 of the balancing circuit 200_2 transmits a wireless signal S_52 corresponding to the balancing message M_52, and the first wireless transmitter 221 of the balancing circuit 200_3 transmits a wireless signal S_53 corresponding to the balancing message M_53.

The wireless signal S_53 may have a phase opposite to the phases of the wireless signal S_51 and the wireless signal S_52. For example, if the wireless signal S_51, the wireless signal S_52 and the wireless signal S_53 are unmodulated sine waves, the wireless signal S_51, the wireless signal S_52 and the wireless signal S_53 may have the same frequency, the amplitude of the wireless signal S_53 may be greater than the amplitude of the wireless signal S_52, and the amplitude of the wireless signal S_52 may be greater than the amplitude of the wireless signal S_51. The amplitude of the wireless signal S_53 may be equal to the sum of the amplitude of the wireless signal S_51 and the amplitude of the wireless signal S_52. Accordingly, the wireless signal S_51, the wireless signal S_52 and the wireless signal S_53 may be at least partially canceled out by each other.

As the wireless signal S_51, the wireless signal S_52 and the wireless signal S_53 are continuously transmitted by the first wireless transmitter 221 of the balancing circuit 200_1, the first wireless transmitter 221 of the balancing circuit 200_2 and the first wireless transmitter 221 of the balancing circuit 200_3, respectively, the SOCs of the battery cell 21_1, the battery cell 21_2 and the battery cell 21_3 are gradually lowered, thereby equalizing the SOCs of the plurality of battery cells 21_1 to 21_N.

In particular, by controlling the amplitude of the wireless signal S_53 to be greater than the amplitude of the wireless signal S_52 and controlling the amplitude of the wireless signal S_52 to be greater than the amplitude of the wireless signal S_51, it is possible to lower the SOC of the battery cell 21_3 most rapidly and lower the SOC of the battery cell 21_1 most slowly.

Figure 13:
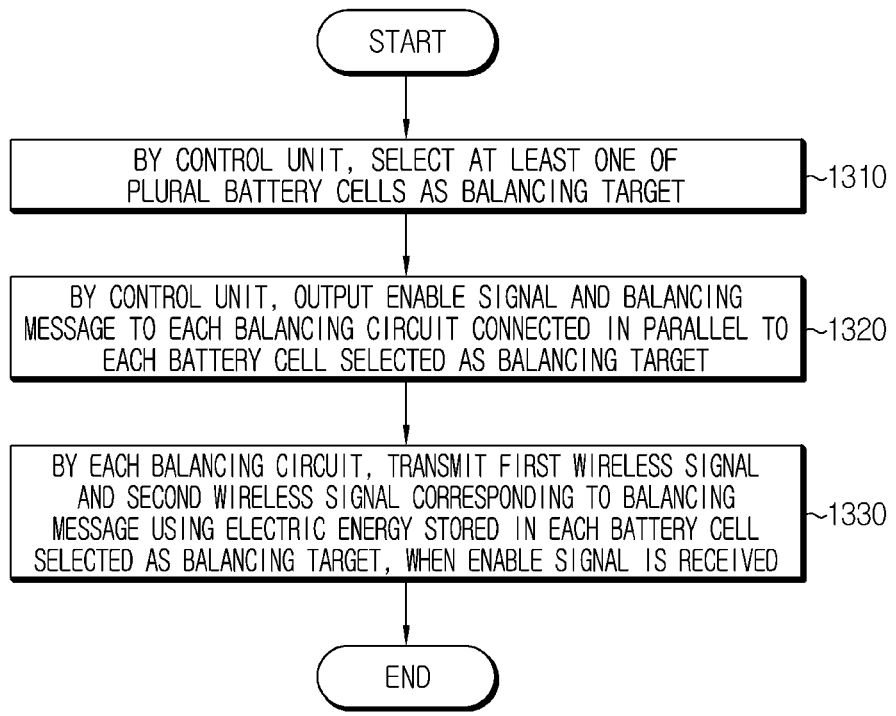
FIG. 13 is a flowchart for illustrating a balancing method according to another embodiment of the present disclosure.

FIG. 13 is a flowchart for illustrating a balancing method according to another embodiment of the present disclosure.

Referring to FIGS. 1 to 13, in Step 1310, the control unit 300 selects at least one battery cell (for example, 21_2) of the plurality of battery cells 21_1 to 21_N as a balancing target, based on the SOCs of the plurality of battery cells 21_1 to 21_N connected in series to each other.

In Step 1320, the control unit 300 outputs an enable signal and a balancing message to each balancing circuit (for example, 200_2) connected in parallel to each battery cell (for example, 21_2) selected as the balancing target.

In Step 1330, when the enable signal from the control unit 300 is received, each balancing circuit (for example, 200_2) connected in parallel to each battery cell (for example, 21_2) selected as the balancing target transmits a first wireless signal and a second wireless signal corresponding to the balancing message by using electric energy stored in each battery cell (for example, 21_2). The first wireless signal and the second wireless signal are at least partially canceled out by each other.

According to the embodiments of the present disclosure described above, instead of using a balancing resistor to consume the energy of the battery cell, the electric energy is converted into the form of a wireless signal and transmitted to the battery cell (for example, 21_2) selected as the balancing target, thereby reducing the heat generation during battery balancing.

In addition, since at least two wireless signals canceled out by each other are generated using the electric energy stored in the battery cell (for example, 21_2), it is possible to reduce interference caused by the wireless signals transmitted during battery balancing.

The embodiments of the present disclosure described hereinabove are not implemented only through the apparatus and method, and may be implemented through programs that realize the functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery pack
20: battery module
30: voltage detection unit
40: current detection unit
100: battery balancing apparatus
200: balancing circuit
210: balancing switch
221: first wireless transmitter
222: second wireless transmitter
300: control unit

What is claimed is:
1. A battery balancing apparatus, comprising:
a plurality of balancing circuits, wherein each balancing circuit is connected in parallel to a respective battery cell among a plurality of battery cells and the plurality of balancing circuits are connected in series to each other, in one-to-one relationship; and
a control unit operably coupled to each balancing circuit, wherein the control unit is configured to select at least one of the plurality of battery cells as a balancing target, based on a SOC of each battery cell, and output an enable signal and a balancing message to each balancing circuit connected to each battery cell selected as the balancing target,
wherein each balancing circuit is configured to transmit a first wireless signal and a second wireless signal corresponding to the balancing message by using electric energy stored in each battery cell, when the enable signal is received by each balancing circuit, and
wherein the first wireless signal and the second wireless signal are at least partially canceled out by each other.
2. The battery balancing apparatus according to claim 1, wherein each balancing circuit includes:
a balancing switch configured to operate in an ON state in response to the enable signal; and
a first wireless transmitter and a second wireless transmitter connected to the balancing switch in series, wherein the first wireless transmitter is configured to transmit the first wireless signal while the balancing switch is operating in the ON state, and wherein the second wireless transmitter is configured to transmit the second wireless signal while the balancing switch is operating in the ON state.

3. The battery balancing apparatus according to claim 1, wherein a phase of the first wireless signal and a phase of the second wireless signal are opposite to each other.

4. The battery balancing apparatus according to claim 3, wherein the first wireless signal and the second wireless signal are unmodulated sine waves having the same frequency and amplitude.

5. A battery balancing apparatus, comprising:

a plurality of balancing circuits, wherein each balancing circuit is connected in parallel to a respective battery cell among a plurality of battery cells and the plurality of balancing circuits are connected in series to each other, in one-to-one relationship; and a control unit operably coupled to each balancing circuit, wherein the control unit selects at least two of the plurality of battery cells as balancing targets, based on a SOC of each battery cell, wherein when a first battery cell and a second battery cell are selected from the plurality of battery cells as the balancing targets, the control unit is configured to transmit an enable signal and a first balancing message to a first balancing circuit among the plurality of balancing circuits connected in parallel to the first battery cell and transmit the enable signal and a second balancing message to a second balancing circuit among the plurality of balancing circuits connected in parallel to the second battery cell, wherein the first balancing circuit is configured to transmit a first wireless signal corresponding to the first balancing message by using electric energy stored in the first battery cell when the enable signal is received by the first balancing circuit, wherein the second balancing circuit is configured to transmit a second wireless signal corresponding to the second balancing message by using electric energy stored in the second battery cell when the enable signal is received by the second balancing circuit, and wherein the first wireless signal and the second wireless signal are at least partially canceled out by each other.

6. The battery balancing apparatus according to claim 5, wherein each balancing circuit includes:

a balancing switch configured to operate in an ON state in response to the enable signal; and a first wireless transmitter connected to the balancing switch in series, wherein the first wireless transmitter is configured to transmit a wireless signal corresponding to a balancing message output from the control unit, while the respective balancing switch is operating in the ON state.

7. The battery balancing apparatus according to claim 5, wherein a phase of the first wireless signal and a phase of the second wireless signal are opposite to each other.

8. The battery balancing apparatus according to claim 7, wherein the first wireless signal and the second wireless signal have the same frequency, and wherein the first wireless signal and the second wireless signal have the same amplitude.

9. The battery balancing apparatus according to claim 5, wherein each balancing circuit further includes a second wireless transmitter connected to the respective balancing switch in series, wherein the control unit is configured to transmit the enable signal and a third balancing message to the second balancing circuit when a SOC of the second battery cell is greater than a SOC of the first battery cell, and wherein the second wireless transmitter of the second balancing circuit is configured to transmit a third wireless signal corresponding to the third balancing message by using electric energy stored in the second battery cell.

10. The battery balancing apparatus according to claim 9, wherein the first wireless signal, the second wireless signal and the third wireless signal have the same frequency, wherein a phase of the second wireless signal is opposite to a phase of the first wireless signal and a phase of the third wireless signal, and wherein an amplitude of the second wireless signal is equal to the sum of an amplitude of the first wireless signal and an amplitude of the third wireless signal.

11. A battery pack, comprising the battery balancing apparatus according to claim 1.

12. A battery balancing method, comprising:

by a control unit, selecting at least one of a plurality of battery cells as a balancing target, based on SOCs of the plurality of battery cells connected in series to each other;

by the control unit, outputting an enable signal and a balancing message to each balancing circuit connected in parallel to each battery cell selected as the balancing target; and by each balancing circuit, transmitting a first wireless signal and a second wireless signal corresponding to the balancing message by using electric energy stored in each battery cell selected as the balancing target, when the enable signal is received by each balancing circuit, wherein the first wireless signal and the second wireless signal are at least partially canceled out by each other.

13. The battery balancing method according to claim 12, wherein a phase of the first wireless signal and a phase of the second wireless signal are opposite to each other.

14. A battery pack, comprising the battery balancing apparatus according to claim 5.

* * * * *